United States Patent
Saji

(10) Patent No.: US 12,313,854 B2
(45) Date of Patent: May 27, 2025

(54) HEAD-UP DISPLAY DEVICE AND MOBILE OBJECT

(71) Applicant: NIPPON SEIKI CO., LTD., Niigata (JP)

(72) Inventor: Shunsuke Saji, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 455 days.

(21) Appl. No.: 17/790,629

(22) PCT Filed: Jan. 27, 2021

(86) PCT No.: PCT/JP2021/002846
§ 371 (c)(1),
(2) Date: Jul. 1, 2022

(87) PCT Pub. No.: WO2021/153616
PCT Pub. Date: Aug. 5, 2021

(65) Prior Publication Data
US 2023/0045329 A1    Feb. 9, 2023

(30) Foreign Application Priority Data

Jan. 31, 2020    (JP) ................................. 2020-014838

(51) Int. Cl.
*G02B 27/01*    (2006.01)
*B60K 35/00*    (2024.01)
(Continued)

(52) U.S. Cl.
CPC .......... *G02B 27/0179* (2013.01); *B60K 35/00* (2013.01); *G02B 27/0093* (2013.01);
(Continued)

(58) Field of Classification Search
CPC ............ G02B 27/0179; G02B 27/0093; G02B 2027/0187; G02B 27/0101;
(Continued)

(56) References Cited

U.S. PATENT DOCUMENTS 9,690,098 B1    6/2017 Kuo
2015/0355461 A1* 12/2015 Kessler .............. G02B 27/0101
359/631

(Continued)

FOREIGN PATENT DOCUMENTS

| JP | 2015-87619 A | 5/2015 |
|---|---|---|
| JP | 2017-56933 A | 3/2017 |
| WO | 2020/009217 A1 | 1/2020 |

OTHER PUBLICATIONS

International Search Report issued in corresponding International Application No. PCT/JP2021/002846, dated Apr. 20, 2021, w/ English Translation (5 pages).

*Primary Examiner* — Mariam Qureshi
(74) *Attorney, Agent, or Firm* — Rimon P.C.

(57) ABSTRACT

A display region has a curved surface shape having upper and lower end portions disposed at positions closer to a visual field than a reference plane, and a central portion disposed at a position farther from the visual field than the reference plane. A first convergence angle difference between a convergence angle from the eye position to the upper end portion and a convergence angle from the eye position to a first point on the reference plane through the upper end portion, a second convergence angle difference between a convergence angle to the central portion and a convergence angle to a second point on the reference plane through the central portion, and a third convergence angle difference between a convergence angle to the lower end (Continued)

portion and a convergence angle to a third point on the reference plane through the lower end portion respectively fall within four milliradians.

14 Claims, 11 Drawing Sheets

(51) Int. Cl.
 *G02B 27/00* (2006.01)
 *B60K 35/10* (2024.01)
 *B60K 35/23* (2024.01)
(52) U.S. Cl.
 CPC .............. *B60K 35/10* (2024.01); *B60K 35/23* (2024.01); *B60K 2360/149* (2024.01); *B60Y 2200/11* (2013.01); *G02B 2027/0187* (2013.01)

(58) Field of Classification Search
 CPC ....................... G02B 2027/0127; B60K 35/00; B60K 35/10; B60K 35/23; B60K 2360/149; B60K 35/21; B60K 35/53; B60K 35/81; B60K 2360/23; B60K 2360/31; B60K 2360/334; B60K 2360/347; B60Y 2200/11
 See application file for complete search history.

(56) References Cited

U.S. PATENT DOCUMENTS

| 2019/0084419 | A1* | 3/2019 | Suzuki | ................... G02B 27/01 |
| 2019/0265468 | A1* | 8/2019 | Hirata | .................. B60K 35/215 |

* cited by examiner

[FIG.1]
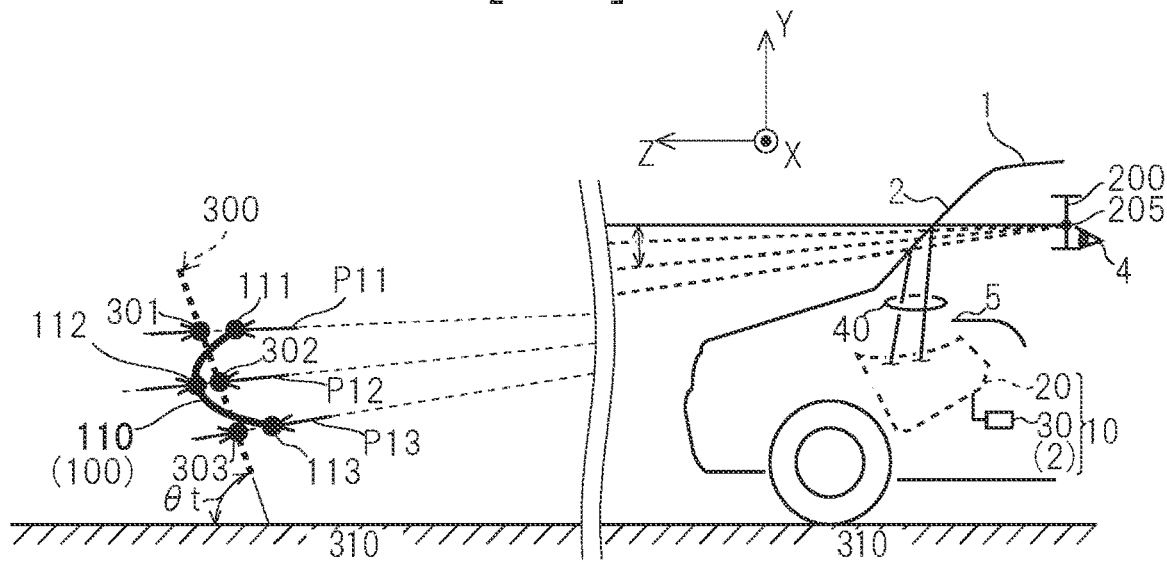
[FIG.2]
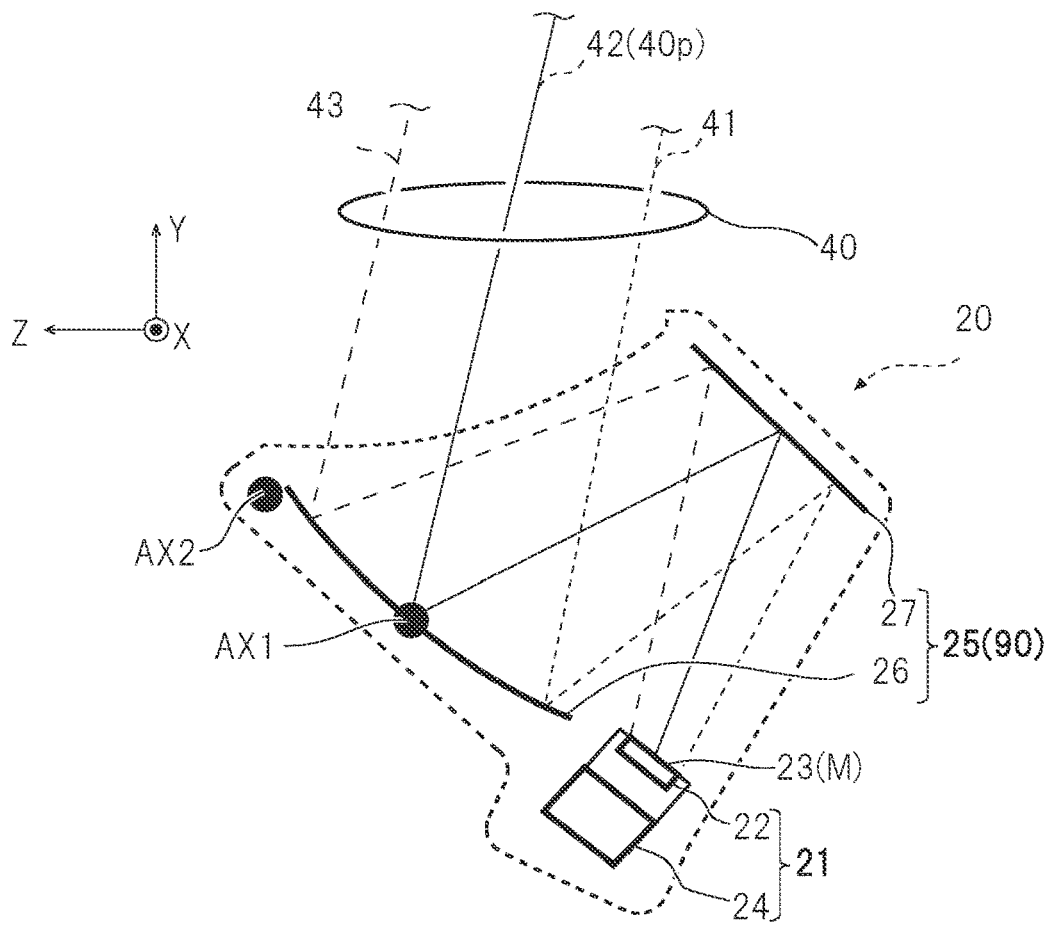

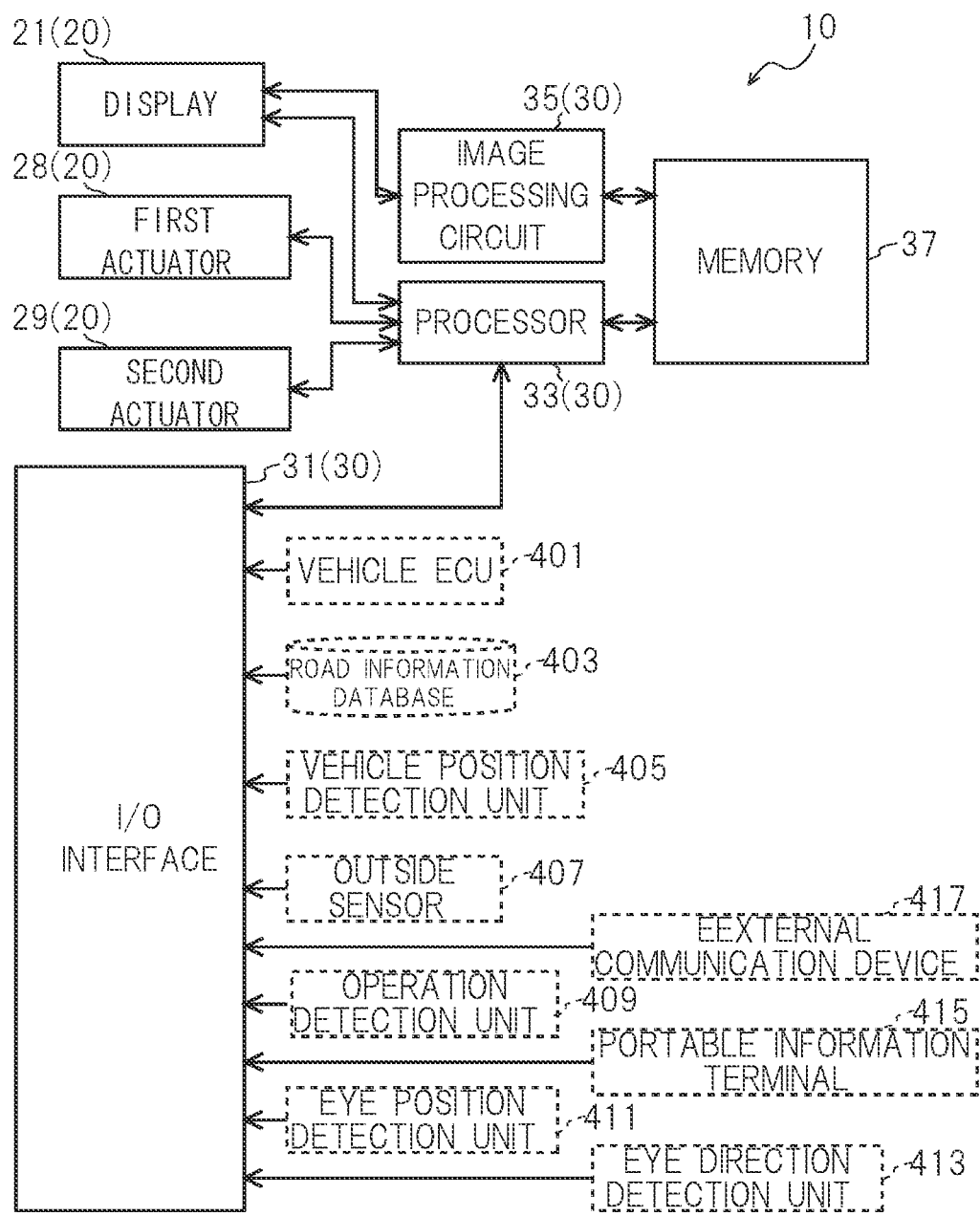
[FIG.3]

[FIG.4A]
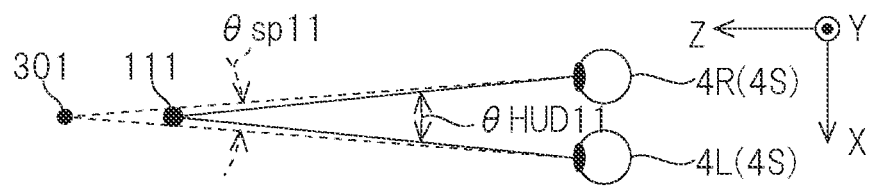
[FIG.4B]
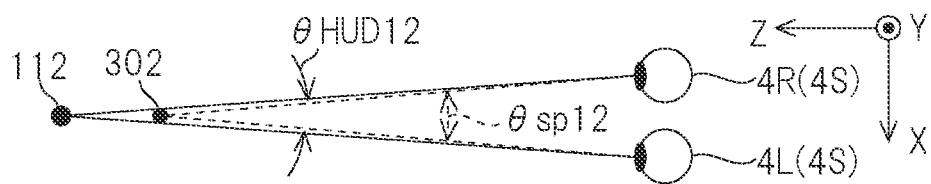
[FIG.4C]
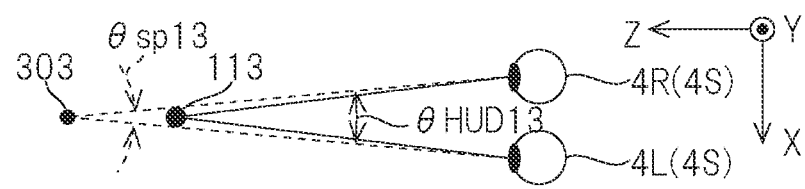

[FIG.5A]
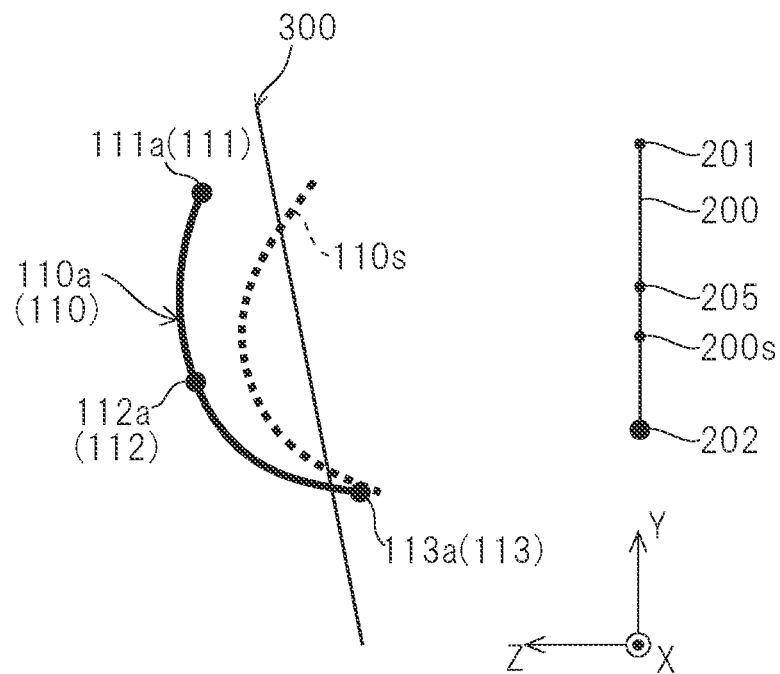
[FIG.5B]
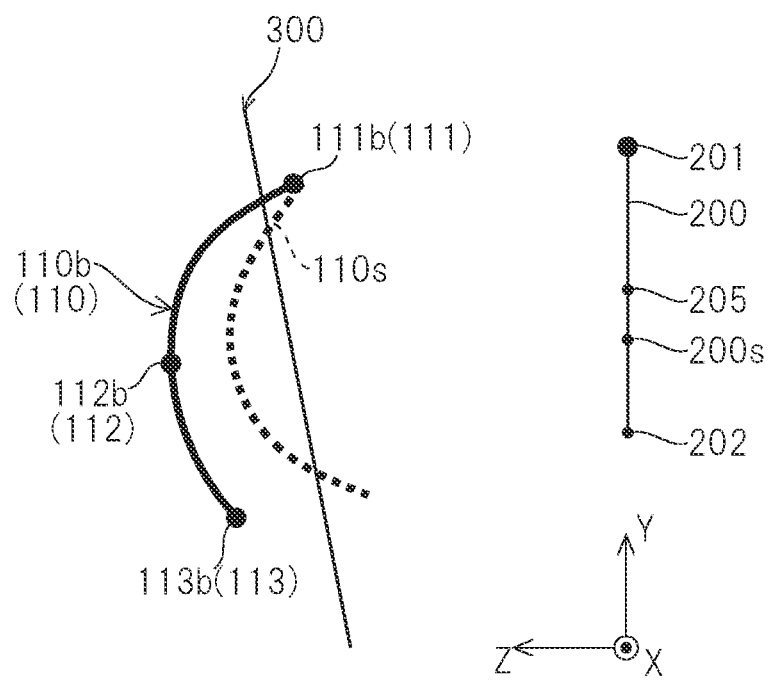

[FIG.6]
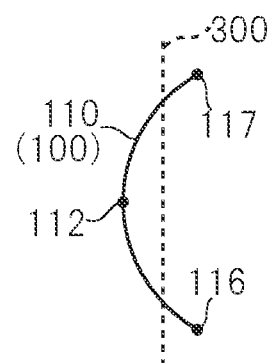
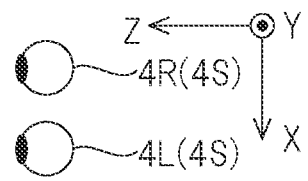

[FIG.7]
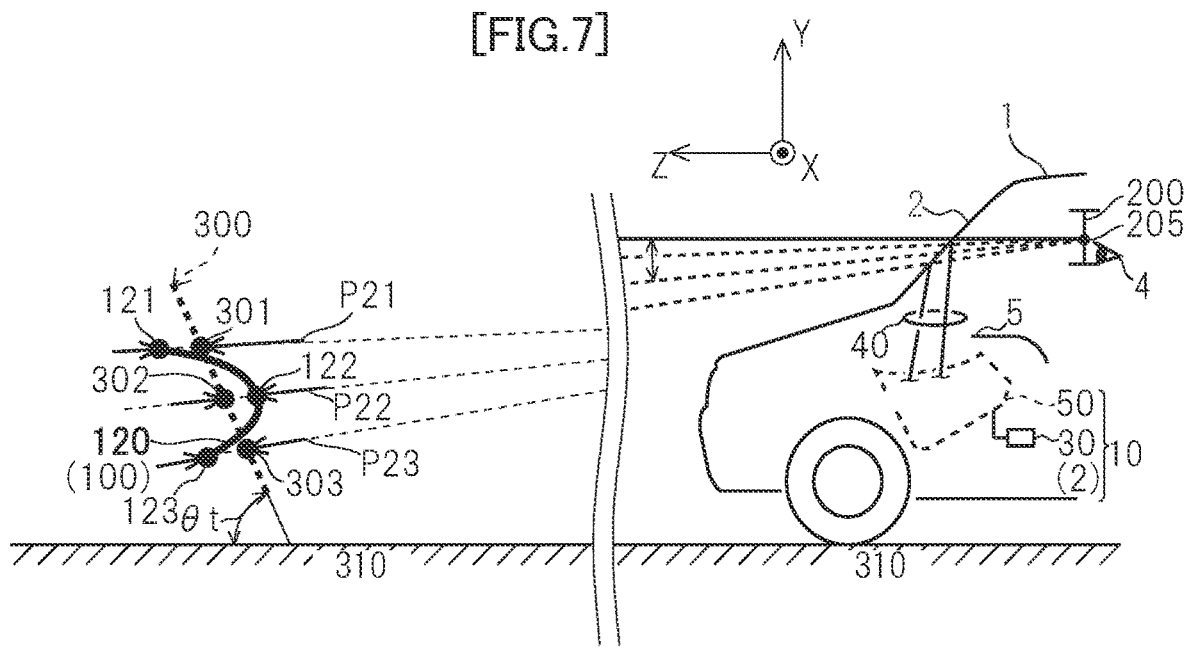
[FIG.8]
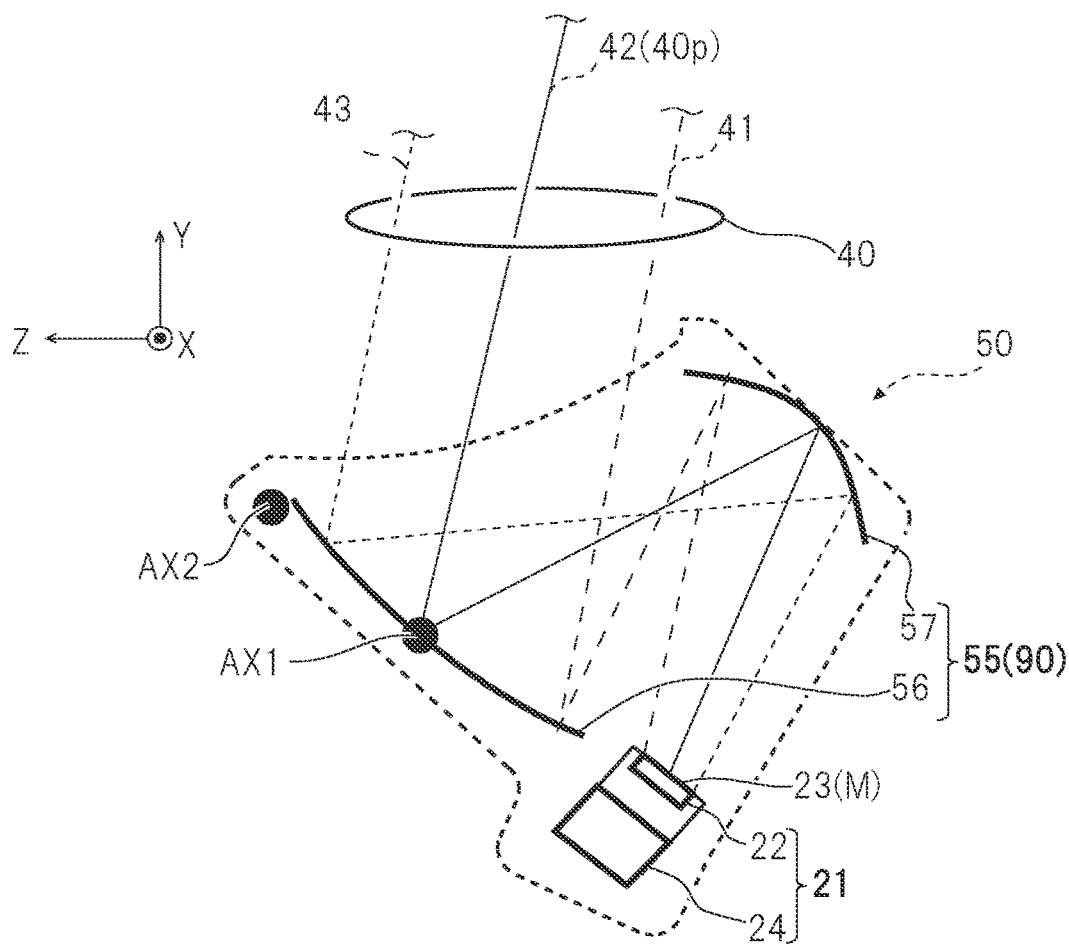

[FIG.9A]
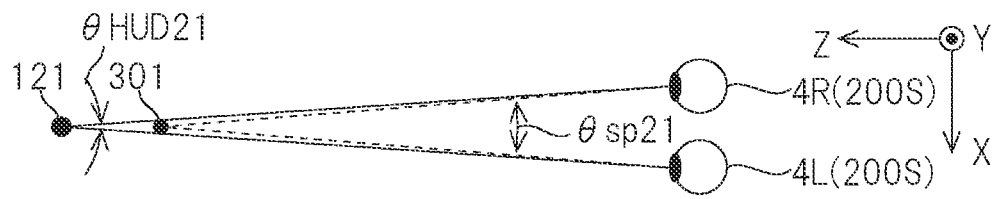
[FIG.9B]
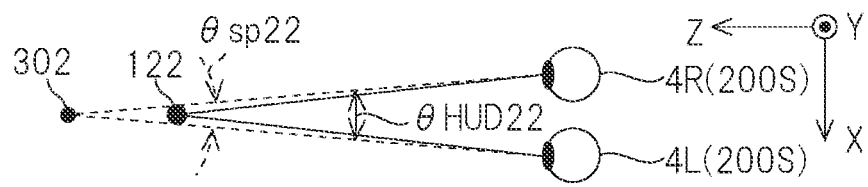
[FIG.9C]
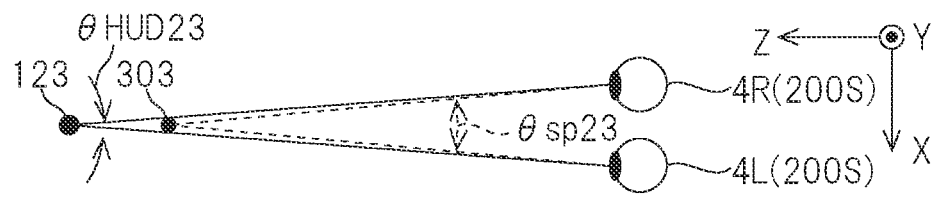

[FIG.10A]
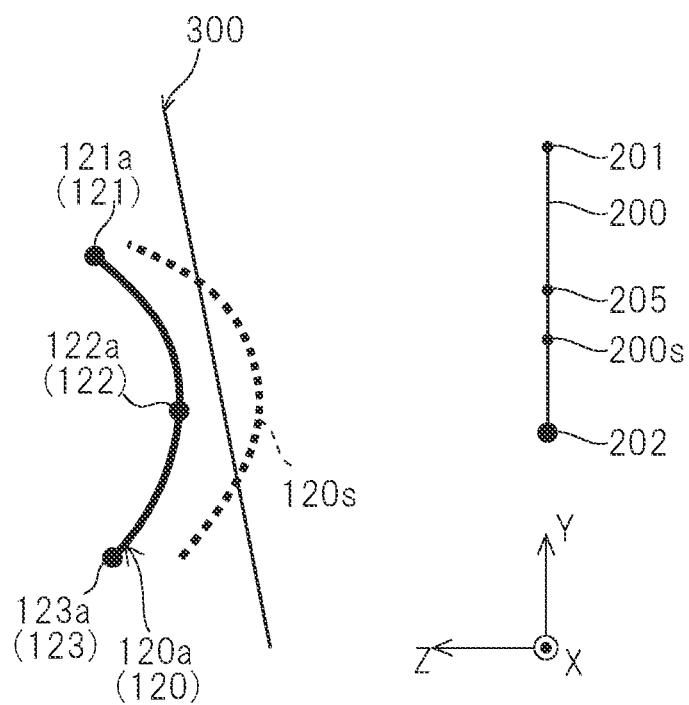
[FIG.10B]
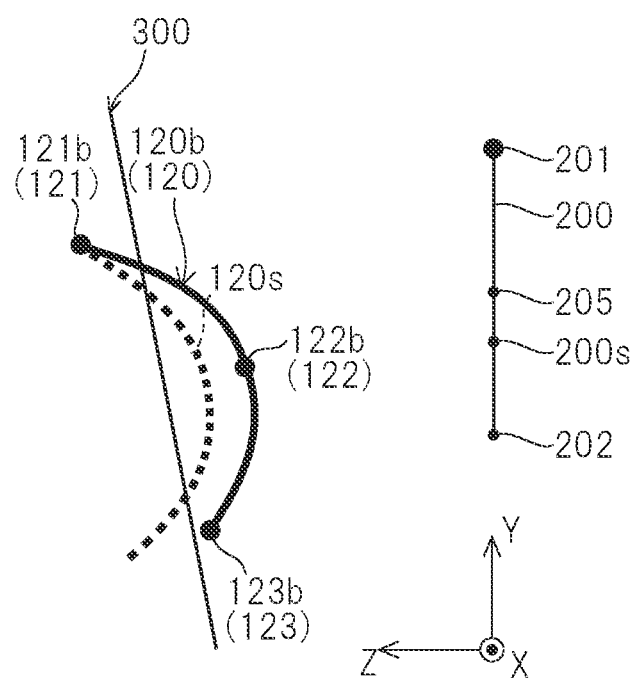

[FIG.11]
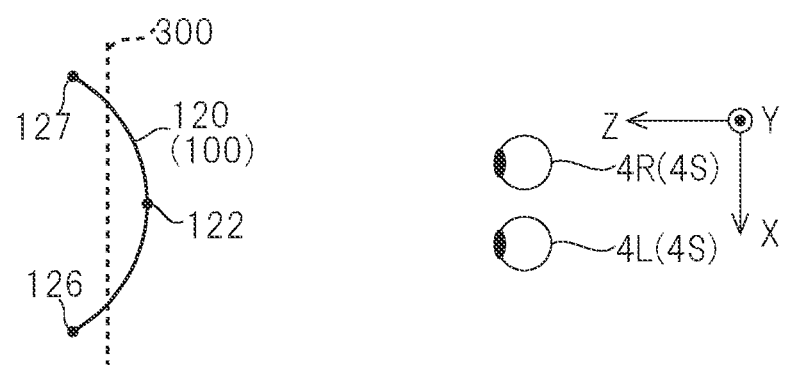

[FIG.12A]
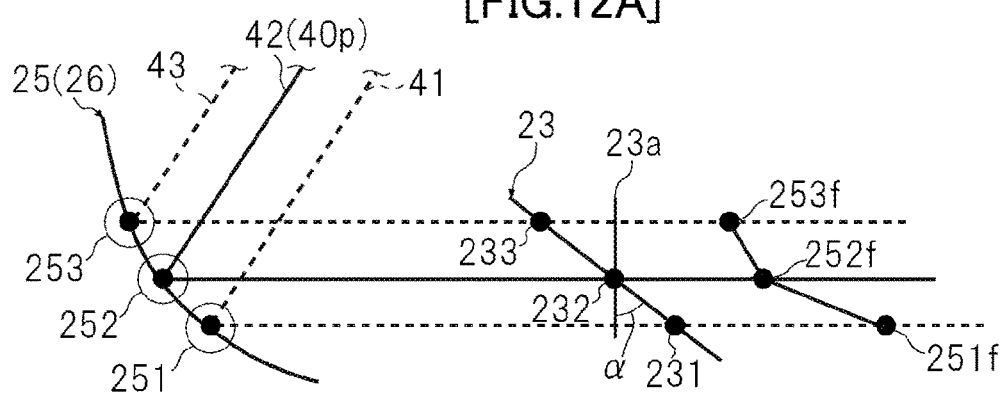
[FIG.12B]
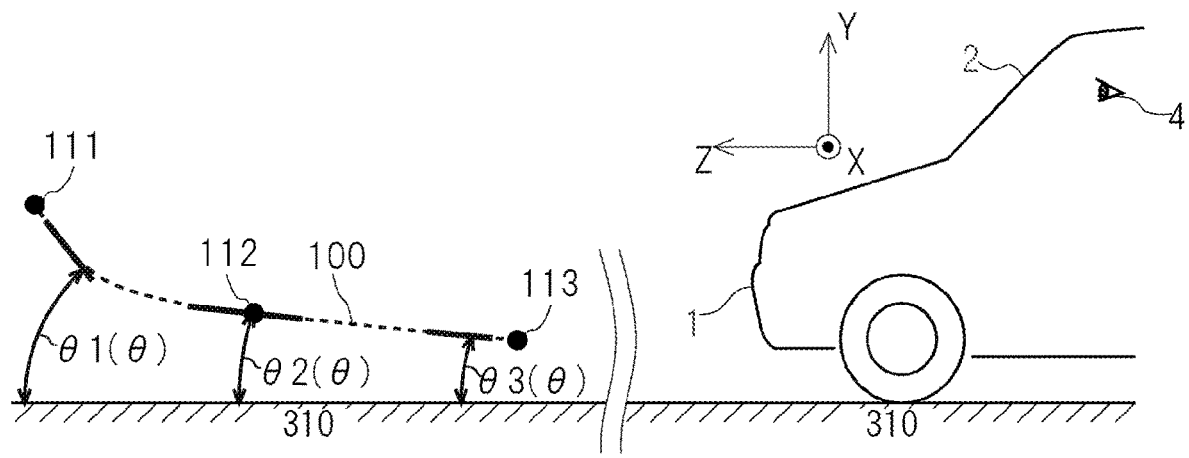

[FIG. 13]

| | | FIRST DISTANCE [m] | | | | | | | |
|---|---|---|---|---|---|---|---|---|---|
| | | 2 | 3 | 4 | 5 | 6 | 7 | 8 | 9 | 10 |
| SECOND DISTANCE [m] | 5 | 19.5 | 8.7 | 3.2 | 0.0 | -2.2 | -3.7 | -4.9 | -5.8 | -6.5 |
| | 6 | 21.7 | 10.8 | 5.4 | 2.2 | 0.0 | -1.5 | -2.7 | -3.6 | -4.3 |
| | 7 | 23.2 | 12.4 | 7.0 | 3.7 | 1.5 | 0.0 | -1.2 | -2.1 | -2.8 |
| | 8 | 24.4 | 13.5 | 8.1 | 4.9 | 2.7 | 1.2 | 0.0 | -0.9 | -1.6 |
| | 9 | 25.3 | 14.4 | 9.0 | 5.8 | 3.6 | 2.1 | 0.9 | 0.0 | -0.7 |
| | 10 | 26.0 | 15.2 | 9.7 | 6.5 | 4.3 | 2.8 | 1.6 | 0.7 | 0.0 |

HEAD-UP DISPLAY DEVICE AND MOBILE OBJECT

CROSS REFERENCE TO RELATED APPLICATIONS

This application is the U.S. National Phase under 35 U.S.C. § 371 of International Application No. PCT/JP2021/002846, filed on Jan. 27, 2021, which claims the benefit of Japanese Application No. 2020-014838, filed on Jan. 31, 2020, the entire contents of each are hereby incorporated by reference.

TECHNICAL FIELD

The present invention relates to a head-up display device that displays a virtual image on a front windshield, a combiner, or the like of a vehicle, and a mobile object.

BACKGROUND ART

A head-up display device that generates a virtual image by image light reflected by a reflective transmissive member such as a front windshield and a combiner of a vehicle and displays the virtual image by superimposing the virtual image on a real scene (scenery in front of the vehicle) that is transmitted through the reflective transmissive member contributes to safe and comfortable vehicle operation by providing information desired by an observer as the virtual image while suppressing the movement of the line of sight of the observer who drives the vehicle as much as possible.

The front windshield (projection target member) is a curved surface, and therefore the image projected on this curved surface is distorted. The head-up display device has an optically-powered relay optical system, and these relay optical system and projection target member make the observer visually recognize an enlarged virtual image of the image. That is, it can be said that the relay optical system and the projection target member form a virtual image optical system. When the eye position of the observer is different, the optical path of the image light reaching that eye position is different. That is, the optical power added to the image light by the virtual image optical system is also different. Therefore, image distortion also occurs in response to change in the eye position of the observer.

Patent Document 1 describes a head-up display device that previously generates an image with distortion that is the opposite of the distortion caused by the virtual image optical system (perform a pre-distortion process), to perceive an image with less distortion when the image is visually recognized as a virtual image.

PRIOR ART DOCUMENT

Patent Document

Patent Document 1: Japanese Patent Application Laid-open No. 2015-87619

SUMMARY OF THE INVENTION

Problems to be Solved by the Invention

Distortion that occurs in an image optical system is not only distortion in the left-right direction and distortion in the up-down direction as seen by an observer, but also can be distortion in the depth direction. For example, even in a case where an entire virtual image is desired to be displayed on a single plane, when this distortion in the depth direction is large, it is assumed that the virtual image perceived by an observer will not be perceived as being on the plane, which causes a feeling that something is wrong.

The present invention has been made in consideration of the above situation, and therefore an object of the present invention is to provide a head-up display device that can display a virtual image of an image in which distortion in the depth direction is difficult to be recognized. Specifically, the problem is to provide a head-up display device that can display a virtual image of an image in which distortion in the depth direction is difficult to be recognized even in a case where an eye position is different within a visual field.

Solution to Problem

According to an aspect of a head-up display device of the present invention, the head-up display device includes: a display having a display surface for emitting image light; and a relay optical system that directs the image light from the display 21 to a visual field in a vehicle through a projection target portion to allow a virtual image of the image to be visually recognized within a display region viewed from within the visual field, wherein the display region includes an upper end portion, a lower end portion, and a central portion between the upper end portion and the lower end portion, the display region has: a first curved surface shape in which the upper end portion and the lower end portion viewed from a predetermined eye position within the visual field are each placed at such a position as to be closer to the visual field with respect to a predetermined reference plane, and the central portion viewed from the predetermined eye position is placed at such a position as to be farther from the visual field with respect to the predetermined reference plane; or a second curved surface shape in which the upper end portion and the lower end portion viewed from the predetermined eye position are each placed at such a position as to be farther from the visual field with respect to the predetermined reference plane, and the central portion viewed from the predetermined eye position is placed at such a position as to be closer to the visual field with respect to the predetermined reference plane, and the display region is formed such that a first convergence angle difference between a convergence angle from the eye position to the upper end portion and a convergence angle from the eye position to a first point located on the reference plane and passing through the upper end portion, a second convergence angle difference between a convergence angle from the eye position to the central portion and a convergence angle from the eye position to a second point located on the reference plane and passing through the central portion, and a third convergence angle difference between a convergence angle from the eye position to the lower end portion and a convergence angle from the eye position to a third point located on the reference plane and passing through the lower end portion are each within four milliradians.

BRIEF DESCRIPTION OF DRAWINGS

FIG. 1 is an explanatory diagram illustrating a vehicle provided with a display system for a mobile object of a first embodiment.

FIG. 2 is an explanatory diagram illustrating a configuration of a head-up display device of FIG. 1.

FIG. 3 is a block diagram illustrating a display control device of FIG. 1.

FIG. 4A illustrates a convergence angle from both eyes located at a predetermined position of a visual field toward an upper end portion of a display region, and a convergence angle toward a first point on a reference plane overlapped on this upper end portion, in the display system for a mobile object of the first embodiment.

FIG. 4B illustrates a convergence angle from the both eyes located at the predetermined position of the visual field toward a middle region of the display region, and a convergence angle toward a second point on the reference plane overlapped on this middle region, in the display system for a mobile object of the first embodiment.

FIG. 4C illustrates a convergence angle from the both eyes located at the predetermined position of the visual field toward a lower end portion of the display region, and a convergence angle toward a third point on the reference plane overlapped on this lower end portion, in the display system for a mobile object of the first embodiment.

FIG. 5A is a diagram illustrating the placement of the display region as viewed from the visual field lower portion of the visual field in the display system for a mobile object of the first embodiment.

FIG. 5B is a diagram illustrating the placement of the display region as viewed from the visual field upper portion of the visual field in the display system for a mobile object of the first embodiment.

FIG. 6 is a diagram illustrating the placement of the display region in the display system for a mobile object of the first embodiment.

FIG. 7 is an explanatory diagram illustrating a vehicle provided with a display system for a mobile object of a second embodiment.

FIG. 8 is an explanatory diagram illustrating a configuration of a head-up display device of FIG. 7.

FIG. 9A illustrates a convergence angle from both eyes located at a predetermined position of a visual field toward an upper end portion of a display region, and a convergence angle toward a first point on a reference plane overlapped on this upper end portion, in the display system for a mobile object of the second embodiment.

FIG. 9B illustrates a convergence angle from the both eyes located at the predetermined position of the visual field toward a middle region of the display region, and a convergence angle toward a second point on the reference plane overlapped on this upper end portion, in the display system for a mobile object of the second embodiment.

FIG. 9C illustrates a convergence angle from the both eyes located at the predetermined position of the visual field toward a lower end portion of the display region, and a convergence angle toward a third point on the reference plane overlapped on this lower end portion, in the display system for a mobile object of the second embodiment.

FIG. 10A is a diagram illustrating the placement of the display region as viewed from a visual field lower portion of the visual field in the display system for a mobile object of the second embodiment.

FIG. 10B is a diagram illustrating the placement of the display region as viewed from a visual field upper portion of the visual field in the display system for a mobile object of the second embodiment.

FIG. 11 is a diagram illustrating the placement of the display region in the display system for a mobile object of the second embodiment.

FIG. 12A is a diagram illustrating the placement of a relay optical system and the display surface of the first embodiment.

FIG. 12B is a diagram illustrating the shape and the placement of a display region formed by the head-up display device of FIG. 12A.

FIG. 13 is a table of convergence angle differences [mrad] between two points as viewed from both eyes, assuming an average interpupillary distance of 65 [mm].

MODE FOR CARRYING OUT THE INVENTION

In the following, FIG. 1 through FIG. 6, FIG. 12A, and FIG. 12B provide explanation of configurations of a display system for a mobile device and a head-up display device of a first embodiment. FIG. 7 through FIG. 11 provide explanation of configurations of a display system for a mobile device and a head-up display device of a second embodiment. The present invention is not limited to the following embodiments (including the contents of the drawings). It is of course possible to make changes (including deletion of components) to the following embodiments. In the following description, explanations of known technical matters will be omitted as appropriate to facilitate the understanding of the present invention.

The following description refers to FIG. 1. A display system 10 for a mobile object includes an HUD (Head-UP Display) device 20, a display control device 30 that controls the HUD device 20, and a projection target member 2. The display system for a mobile object according to this embodiment is employed in an automobile in FIG. 1. However, the present invention is not limited to an automobile, and the display system for a mobile object can be employed in a display device for a mobile object. In the description of this embodiment, the left-right direction when an observer seated in a driver's seat of a vehicle 1 (typically, a driver of the vehicle 1) faces the front of the vehicle is the X axis (left direction is the X axis positive direction), the up-down direction is the Y axis (upward direction is the Y axis positive direction), and the front-rear direction is the Z axis (front direction is the Z axis positive direction).

The HUD device 20 emits image light 40 toward a front windshield (an example of the projection target member 2), and the projection target member 2 reflects the image light 40 of an image M displayed by the HUD device 20 to a visual field 200. By placing an eye position 4 within the visual field 200, the observer can be visually recognize a virtual image of the image M displayed by the HUD device 20, at such a position that the virtual image overlaps the foreground which is a real space visually recognized through the projection target member 2.

The term "visual field" used in the description of this embodiment means: (1) an region where an entire virtual image of the image M within the display region 100 can be visually recognized within the region, and where at least a part of the virtual image of the image M cannot be visually recognized outside the region; (2) a region where an entire virtual image of the image M can be visually recognized at a predetermined luminance or higher within the region, and where a part of the virtual image of the image M is less than the predetermined luminance outside the region; or (3) a region where at least a part of the virtual image can be stereoscopic in the region, and any part of the virtual image cannot be stereoscopically viewed outside the region when the HUD device 20 is capable of displaying a stereoscopically visible virtual image. That is, when the eye position 4 of the observer is placed outside the visual field 200, the observer cannot visually recognize a part of the virtual image of the image M, the visibility of a part of the virtual image of the image M is very low and it is difficult to perceive, or the virtual image of the image M cannot be stereoscopically viewed. The predetermined luminance is, for example, about 1/50 of the luminance of the virtual image of the image M that is visually recognized at the center of the visual field.

FIG. 2 is a diagram illustrating a configuration of the HUD device 20 of this embodiment. The HUD device 20 includes a display 21 having a display surface on which an image is displayed, and a relay optical system 25.

The display 21 of FIG. 2 is a projection-type display consisting of a projector 22 (an example of an image generation unit) and a screen (an example of a display surface 23) that receives projection light from the projector 22 and displays an image (real image). The display 21 may be a transmission type display (an example of the image generation unit) that transmits light from a back light such as an LCD, or may be a self-luminous display (an example of the image generation unit). In these cases, the display surface is a display surface of the transmission type display (an example of the display surface 23) and are the screen (an example of the display surface 23) of the projection type display. The display surface is placed so as to incline from an angle perpendicular to an optical axis 40*p* of the image light 40 directed from the display surface to the visual field (the center of the visual field) via the relay optical system 25 described later and the projection target member 2, so that the display region 100 can be placed along a road surface 310.

The display 21 may be mounted with an actuator (not illustrated) including a motor or other device controlled by the display control device 30, and the display surface 23 may be movable and/or rotatable.

The relay optical system 25 is placed on an optical path of light of an image from the display 21 (light from the display 21 toward the visual field) between the display 21 and the projection target member 2, and is composed of one or more optical members that project the light of the image from the display unit 21 onto the projection target member 2 outside the HUD device 20. The relay optical system 25 of FIG. 2 includes one concave-shaped first mirror 26 and one plane second mirror 27. The relay optical system 25 includes the two mirrors in this embodiment, but is not limited to this. In addition to or instead of these, the relay optical system 25 may include one or more refractive optical components such as lenses, diffractive optical components such as holograms, reflective optical components, or combinations thereof.

The relay optical system 25 has the two rotation axes (a first rotation axis AX1 and a second rotation axis AX2) that move the visual field 200 in the up-down direction (Y-axis direction). The first rotation axis AX1 and the second rotation axis AX2 are each set so as not to be perpendicular to the left-right direction (X-axis direction) (in other words, not to be parallel to the YZ plane) of the vehicle 1 in a state in which the HUD device 20 is mounted in the vehicle 1. Specifically, the angle between each of the first rotation axis AX1 and the second rotation axis AX2 and the left-right direction (X-axis direction) of the vehicle 1 is set to less than 45 [degrees], and more preferably less than 20 [degrees].

According to the rotation of the relay optical system 25 on the first rotation axis AX1, an amount of movement in the up-down direction of a display region 100 is relatively small, and an amount of movement in the up-down direction of the visual field 200 is relatively large. According to the rotation of the relay optical system 25 on the second rotation axis AX2, an amount of movement in the up-down direction of the display region 100 is relatively large, and an amount of movement in the up-down direction of the visual field 200 is relatively small. That is, when the first rotation axis AX1 is compared with the second rotation axis AX2, "the amount of movement in the up-down direction of the visual field 200/the amount of movement in the up-down direction of the display region 100" caused by the rotation on the first rotation axis AX1 is larger than "the amount of movement in the up-down direction of the visual field 200/the amount of movement in the up-down direction of the display region 100" caused by the rotation on the second rotation axis AX2. In other words, a relative amount of the amount of movement in the up-down direction of the display region 100 and the amount of movement in the up-down direction of the visual field 200 caused by the rotation of the relay optical system 25 on the first rotation axis AX1 is different from a relative amount of the amount of movement in the up-down direction of the display region 100 and the amount of movement in the up-down direction of the visual field 200 caused by the rotation of the relay optical system 25 on the second rotation axis AX2.

The HUD device 20 includes a first actuator 28 that rotates the first mirror 26 on the first rotation axis AX1, and a second actuator 29 that rotates the first mirror 26 on the second rotation axis AX2. In other words, the HUD device 20 rotates one relay optical system 25 on the two axes (the first rotation axis AX1 and the second rotation axis AX2). The first actuator 28 and the second actuator 29 may be configured as one integrated two-axis actuator.

In addition, the HUD device 20 in the other embodiment rotates two relay optical systems 25 in the two axes (the first rotation axis AX1 and the second rotation axis AX2). For example, the HUD device 20 may include the first actuator 28 that rotates the first mirror 26 on the first rotation axis AX1, and the second actuator 29 that rotates the second mirror 27 on the second rotation axis AX2.

In a case where the amount of movement in the up-down direction of the visual field 200 relatively increases due to the rotation on the first rotation axis AX1, and the amount of movement in the up-down direction of the display region 100 relatively increases due to the rotation on the second rotation axis AX2, placement of the first rotation axis AX1 and the second rotation axis AX2 is not limited to this. Drive by the actuators may also include movement in addition to or instead of rotation.

The HUD device 20 in other embodiments does not need to drive the relay optical system 25. In other words, the HUD device 20 does not have to rotate the relay optical system 25, and/or have an actuator that rotates the relay optical system 25. The HUD device 20 of this embodiment can include a wide visual field 200 that covers the range of the eye height of a driver who is expected to use the vehicle 1.

FIG. 3 is a block diagram of the display system 10 for a mobile device. The display control device 30 includes one or more I/O interfaces 31, one or more one or more processors 33, one or more image processing circuits 35, and one or more memories 37. The various functional blocks illustrated in FIG. 3 may be configured in hardware, software, or a combination of both.

As illustrated in the figure, the processor 33 and the image processing circuit 35 are operably connected to the memory 37. More specifically, the processor 33 and the image processing circuit 35 execute a program stored in the memory 37, so that, for example, operation of the display system 10 for a mobile object, such as generation and/or transmission of image data can be performed. The processor 33 and/or the image processing circuit 35 may include at least one general-purpose microprocessor (e.g., a central processing unit (CPU)), at least one application-specific integrated circuit (ASIC), at least one field programmable gate array (FPGA), or any combination thereof. The memory 37 includes any type of a magnetic medium such as a hard disk, any type of an optical medium such as a CD and a DVD, any type of a semiconductor memory such as a volatile memory, and a non-volatile memory. The volatile memory may include a DRAM and a SRAM, and the non-volatile memory may include a ROM and a NVRAM.

As illustrated in the figure, the processor 33 is operably connected to the I/O interface 31. The I/O interface 31 performs communication according to the CAN (Controller Region Network) standard (also referred to as CAN communication) with a vehicle ECU 401, and/or other electronic devices (reference numerals 403 to 417 to be described later) provided in the vehicle. The communication standard employed by the I/O interface 31 is not limited to CAN, and includes in-vehicle communication (internal communication) interface which is a wired communication interface such as CANFD (CAN with Flexible Data Rate), LIN (Local Interconnect Network), Ethernet (registered trademark), MOST (Media Oriented Systems Transport: MOST is a registered trademark), UART, or USB, or is a short-range wireless communication interface within several tens of meters, such as a personal area network (PAN) such as Bluetooth (registered trademark) network, a local area network (LAN) such as 802.11x Wi-Fi (registered trademark). In addition, the I/O interface 31 may include an external communication (external communication) interface such as a wide-area communication network (for example, Internet communication network), according to a cellar communication standard such as Wireless WiMAX Network (WWANO, IEEE802.16-2004 (WiMAX: Worldwide Interoperability for Microwave Access)), IEEE802.16e Base (Mobile WiMAX), 4G, 4G-LTE, LTE Advanced, and 5G.

As illustrated in the figure, the processor 33 is interoperably connected to the I/O interface 31, so that the processor 33 can exchange information with various other electronic devices connected to the display system 10 for a mobile object (I/O interface 31). To the I/O interface 31, for example, a vehicle ECU 401, a road information database 403, a vehicle position detection unit 405, an outside sensor 407, an operation detection unit 409, an eye position detection unit 411, an eye direction detection unit 413, a portable information terminal 415, and an external communication device 417, and the like are operably connected. The I/O interface 31 may include a function of processing (converting, calculating, analyzing) information received from other electronic devices or the like connected to the display system 10 for a mobile object.

The display 21 is operably connected to the processor 33 and the image processing circuit 35. Therefore, the image displayed by the image display unit 20 may be based on image data received from the processor 33 and/or the image processing circuit 35. The processor 33 and the image processing circuit 35 control the image displayed by the image display unit 20 on the basis of the information acquired from the I/O interface 31.

The display region 100 generated by the HUD device 20 is a curved surface or a partially curved surface region, and is also called an image formation surface. The display region 100 is a position where a virtual image of the display surface 23 (see FIG. 1) of the display 21 of the HUD device 20 is formed. That is, it can be said that the display region 100 corresponds to the display surface described later of the HUD device 20 (in other words, the display region 100 has a conjugate relation with the display surface of the display 21 described below), and the virtual image visually recognized in the display region 100 corresponds to the image M displayed on the display surface 23 of the HUD device 20 described later. It is preferable that the display region 100 itself has low visibility to such an extent as not to actually visually recognized by the observer or as to be difficult to be visually recognized by the observer. In the following, an embodiment of the display region 100 generated by the HUD device 20 will be described.

First Embodiment

A display system 10 for a mobile object (HUD device 20) according to the first embodiment is optically designed such that a first display region 110 placed as viewed from the visual field 200 has a concave shape on the side of the visual field 200, in the cross-sectional shape of the first display region 110 on a plane (YZ plane) parallel to the front-rear direction and the vertical direction of a vehicle 1, as illustrated in FIG. 1. That is, with a line segment connecting an upper end portion 111 and a lower end portion 113 of the first display region 110 as a reference, a middle region between the upper end portion 111 and the lower end portion 113 (including a central portion 112 which is the center between the upper end portion 111 and the lower end portion 113 when an observer views the first display region 110) is placed away from the visual field 200.

In FIG. 1, a reference plane 300 that is not curved (has no curvature) in the left-right direction (X axis) and the up-down direction (Y axis) of the vehicle 1 is virtually set in front of the vehicle 1, and in the display system 10 for a mobile object (HUD device 20) according to the first embodiment, the upper end portion 111 and the lower end portion 113 are each placed at such a position as to be closer to the visual field 200 with respect to the reference plane 300, and the central portion 112 is placed at such a position as to be farther from the visual field 200 with respect to the reference plane 300.

The following description refers to FIG. 4A through FIG. 4C. FIG. 4A through FIG. 4C are diagrams illustrating respective convergence angles toward points of the display region generated by the HUD device, and respective convergence angles toward points on the reference plane overlapped on the points. In each of FIG. 4A through FIG. 4C, θHUD denotes the convergence angle from both eyes (a right eye 4R and a left eye 4L) located at a predetermined position of the visual field 200 toward the point (the upper end portion 111, the central portion 112, or the lower end portion 113) in the display region 100, and θsp denotes the convergence angle toward the point (the first point 301, the second point 302, or the third point 303) on the reference plane 300 and intersecting with a line connecting the center of the both eyes (the right eye 4R and the left eye 4L) and the point (the upper end portion 111, the central portion 112, or the lower end portion 113) of the display region 100.

FIG. 4A illustrates the convergence angle from the both eyes (the right eye 4R and the left eye 4l) located at the predetermined position of the visual field 200 toward the upper end portion 111 of the first display region 110, and the convergence angle toward the first point 301 located on the reference plane 300 and overlapped on this upper end portion 111. Herein, the first display region 110 (upper end portion 111) is closer to the predetermined position of the visual field 200 with respect to the reference plane 300 (first point 301). That is, the convergence angle θHUD11 toward the upper end portion 111 of the first display region 110 is larger than the convergence angle θsp11 toward the first point 301 on the reference plane 300.

FIG. 4B illustrates the convergence angle from the both eyes (the right eye 4R and the left eye 4L) located at the predetermined position of the visual field 200 toward the central portion 112 of the first display region 110, and the convergence angle toward the second point 302 located on the reference plane 300 and overlapped on this upper end portion 111. Herein, the first display region 110 (central portion 112) is farther from the predetermined position of the visual field 200 with respect to the reference plane 300 (second point 302). That is, the convergence angle θHUD12 toward the central portion 112 of the first display region 110 is smaller than the convergence angle θsp12 toward the second point 302 on the reference plane 300.

FIG. 4C illustrates the convergence angle from the both eyes (the right eye 4R and the left eye 4L) located at the predetermined position of the visual field 200 toward the lower end portion 113 of the first display region 110, and the convergence angle toward the third point 303 located on the reference plane 300 and overlapped on this lower end portion 113. Herein, the first display region 110 (lower end portion 113) is closer to the predetermined position of the visual field 200 with respect to the reference plane 300 (third point 303). That is, the convergence angle θHUD13 toward the lower end portion 113 of the first display region 110 is larger than the convergence angle θsp13 toward the third point 303 on the reference plane 300.

A difference between θHUD and θsp is referred to as a convergence angle difference P (P11, P12, P13 in FIG. 1). This convergence angle difference is preferably set within a predetermined value (threshold) θth. That is, an amount of convergence angle displacement caused by the displacement between a virtual image formation point and a virtual plane (reference plane) relative to the virtual image formation point is set within the threshold θth, so that the distance displacement (also referred to as focus displacement) can make difficult for the observer to perceive. In this embodiment, for example, the convergence angle difference P11 between the upper end portion 111 of the first display region 110 and the reference plane 300 (difference between the convergence angle θHUD11 and the convergence angle θsp11), the convergence angle difference P12 between the central portion 112 of the first display region 110 and the reference plane 300 (difference between the convergence angle θHUD12 and the convergence angle θsp12), the convergence angle difference P13 between the lower end portion 113 of the first display region 110 and the reference plane 300 (difference between the convergence angle θHUD13 and the convergence angle θsp13) are each set within the threshold θth, so that the shape of the first display region 110 is approximated to the plane (reference plane 300). That is, the virtual image displayed in the first display region 110 is easily perceived by the observer as displayed on the plane.

The result of calculation of the convergence angle difference [mrad] between the two points as viewed from the both eyes (assuming that an average interpupillary distance is 65 [mm]) are illustrated in FIG. 13. Where a first distance is from 2 to 10 [m], and a second distance is from 5 to 10 [m], a numerical value at the intersection of the two distances represents the convergence angle difference [mrad] between the first distance and the second distance. For example, in a case where the first distance is 6 [m], and the second distance is 7 [m], the convergence angle difference between the two points viewed from the both eyes (assuming that the average interpupillary distance is 65 [mm]) is 3.7 [mrad].

This applicant recognizes that the convergence angle difference between the two points is within 4 [mrad] (0.23 [degree]), so that the distance difference between the two points in the depth direction is difficult to be perceived. In addition, the applicant recognizes that the convergence angle difference between the two points is more preferably within 2 [mrad] (0.11 [degree]), so that the distance difference between the two points is more difficult to be perceived. In FIG. 13, a portion where the convergence angle difference between the two points is 4 [mrad] is circled by a bold line. For example, when the first distance is 6 [m], the range from 5 to 9 [m] (specifically, the range from 4.4 to 9.5 [m]) is the range where the convergence angle difference between the two points is 4 [mrad], and the distance difference is difficult to be perceived. Therefore, the threshold θth of the convergence angle difference can be set to 4 [mrad], more preferably can be set to 2 [mrad].

The reference plane 300 is set such that the convergence angle differences P11, P12 and P13 are equal with respect to the display region 100 when viewed from the predetermined visual field reference position 200s in the visual field 200. In some embodiments, the visual field reference position 200s is set at a predetermined position between a visual field center 205 and a visual field lower end 203 in the up-down direction (Y-axis direction) of the visual field 200. This will be described below. The shape and the placement of the display region 100 is changed depending on the eye position 4 of the observer.

FIG. 5A is a diagram illustrating a first display region 110a placed when viewed from a visual field lower end 202 of the visual field 200. As a comparative example, the first display region 110s placed when viewed from the visual field reference position 200s is illustrated by dotted lines. In the first display region 110a placed when viewed from the visual field lower end 203, an upper end portion 111a and a central portion 112a are each placed at such a position as to be farther from the visual field 200 with respect to the reference plane 300, and the lower end portion 113 is placed at such a position as to be closer to the visual field 200 with respect to the reference plane 300. When the display region 100s and the first display region 110a are compared with each other, the position of the upper end portion 111a changes significantly, but crosses over the reference plane 300, and therefore it is possible to suppress the amount of change (increase) in the distance difference from the reference plane 300 with respect to the movement amount of the upper end portion 111 (convergence angle difference P11).

FIG. 5B is a diagram illustrating a first display region 110b placed when viewed from a visual field upper end 201 of the visual field 200. As a comparative example, the first display region 110s placed when viewed from the visual field reference position 200s is illustrated by dotted lines. In the first display region 110b placed when viewed from the visual field upper end 201, a lower end portion 113b and a central portion 112b are each placed at such a position as to be farther from the visual field 200 with respect to reference plane 300, and the upper end portion 111 is placed at such a position as to be closer to the visual field 200 with respect to the reference plane 300. When the display region 100s and the first display region 110b are compared with each other, the position of the lower end portion 113b changes significantly, but crosses over the reference plane 300, and therefore it is possible to suppress the amount of change (increase) in the distance difference from the reference plane 300 with respect to the movement amount of the lower end portion 113b (convergence angle difference P13).

In a case where the projection target member 2 of the vehicle 1 is a front windshield, the change of the shape and the placement of the display region 100 due to the change of the eye position is relatively large in a lower region of the visual field 200 (for example, a region on the lower side with respect to the visual field center 205). The change of the shape and the placement of the display region 100 is relatively small in an upper region of the visual field 200 (for example, a region on the upper side with respect to the visual field center 205). Therefore, in the HUD device 20 of this embodiment, the predetermined position in the up-down direction (Y-axis direction) of the visual field 200 between the visual field center 205 and the visual field lower end 203 is set to the visual field reference position 200s, and the shape and the placement of the display region 100 when viewed from this visual field reference position 200s are set such that the points of the display region 100 (the upper end portion 111, the central portion 112, and the lower end portion 113) are closed to the desired reference plane 300. Specifically, the display region 100 is formed such that the first convergence angle difference P11, the second convergence angle difference P12, and the third convergence angle difference P13 from the visual field reference position 200s are approximately equal to each other. Consequently, even in a case where the eye position 4 differs within the visual field 200, displacement from the desired reference plane 300 can be reduced. The shape and the placement of the display region 100 and the range of the visual field 200 are set such that the upper end portion 111 crosses over the reference plane 300 at the visual field lower end 203 (see FIG. 5A), the lower end portion 113 crosses over the reference plane 300 at the visual field upper end 201 (see FIG. 5B) in the above embodiment, but may be one of these. That is, for example, the upper end portion 111 may cross over the reference plane 300 at the visual field lower end 203 (see FIG. 5A), and the lower end portion 113 may not cross over the reference plane 300 at the visual field upper end 201. In this embodiment, there is a possibility that the upper end portion 111 does not cross over the reference plane 300 at the visual field lower end 203 (see FIG. 5A), and the lower end portion 113 does not cross over the reference plane 300 at the visual field upper end 201.

In some embodiments of the HUD device 20, the shape and the placement of the display region 100 and the range of the visual field 200 may be set such that the maximum value of the convergence angle difference P between the first display region 110a and the reference plane 300 when the eye position 4 is located at the visual field lower end 203, and the maximum value of the convergence angle difference P between the first display region 110b and the reference plane 300 when the eye position 4 is located at the visual field upper end 201 are approximately equal to each other. Specifically, for example, in the HUD device 20, the shape and the placement of the display region 100 and the range of the visual field 200 may be set such that the convergence angle difference P11 between the upper end portion 111a of the first display region 110a and the reference plane 300 when the eye position 4 is located at the visual field lower end 203, and the convergence angle difference P13 between the lower end portion 113b of the first display region 110b and the reference plane 300 when the eye position 4 is located at the visual field upper end 201 are approximately equal to each other. Consequently, even in a case where the eye position 4 differs within the visual field 200, displacement from the desired reference plane 300 can be reduced.

In the above embodiment, the first display region 110 having a first curved shape is concave toward the visual field 200 in the left-right direction (X-axis) of the vehicle 1. However, in addition to the above, the first display region 110 may be concave toward the visual field 200 in the up-down direction (Y axis) of the vehicle 1. The display system 10 for a mobile object (HUD device 20) in this embodiment is optically designed such that the first display region 110 placed when viewed from the visual field 200 is concave on the visual field 200 side in the cross-sectional shape of the first display region 110 in the plane parallel to the front-rear direction and the left-right direction of the vehicle 1 (ZX plane), as illustrated in FIG. 6. That is, with a line segment connecting a left end portion 116 and a right end portion 117 of the first display region 110 as a reference, a middle region between the left end portion 116 and the right end portion 117 (including a central portion 112 which is the center between the left end portion 116 and the right end portion 117 when the observer views the first display region 110) is placed away from the visual field 200.

As illustrated in FIG. 6, in the display system 10 for a mobile object (HUD device 20) according to the first embodiment, the first display region 110 placed when the center of the both eyes is placed at the center in the left-right direction of the visual field 200 has the left end portion 116 and the right end portion 117 placed at such a position as to be closer to the visual field 200 with respect to the reference plane 300, and has the central portion 112 placed at such a position as to be farther from the visual field 200 with respect to the reference plane 300. The first display region 110 placed when the center of the both eyes is placed on the right side from the center in the left-right direction of the visual field 200 has the left end portion 116 and the central portion 112 placed at such a position as to be farther from the visual field 200 with respect to the reference plane 300, and has the right end portion 117 placed at such a position as to be closer to the visual field 200 with respect to the reference plane 300. On the contrary, the first display region 110 placed when the center of the both eyes is placed on the left side from the center in the left-right direction of the visual field 200 has the right end portion 117 and the central portion 112 placed at such a position as to be farther from the visual field 200 with respect to the reference plane 300, and has the left end portion 116 placed at such a position as to be closer to the visual field 200 with respect to the reference plane 300. That is, the shape and the placement of the display region 100 and the range of the visual field 200 are set such that the left end portion 116 crosses over the reference plane 300 in a visual field right portion (not illustrated), and the right end portion 117 crosses over the reference plane 300 in a visual field left portion (not illustrated), but may be one of these. That is, for example, the left end portion 116 may cross over the reference plane 300 in the visual field right portion (not illustrated), and the right end portion 117 may not cross over the reference plane 300 in a visual field left portion (not illustrated). In this embodiment, there is a possibility that the left end portion 116 does not cross over the reference plane 300 in the visual field right portion, and the right end portion 117 does not cross over the reference plane 300 in a visual field left portion.

Second Embodiment

A display system 10 for a mobile object (HUD device 50) according to a second embodiment is optically designed such that a second display region 120 placed as viewed from a visual field 200 has a concave shape on the side of the visual field 200, in the cross-sectional shape of the second display region 120 on a plane (YZ plane) parallel to the front-rear direction and the vertical direction of a vehicle 1, as shown in FIG. 7. That is, with a line segment connecting an upper end portion 121 and a lower end portion 123 of the second display region 120 as a reference, a middle region between the upper end portion 121 and the lower end portion 123 (including a central portion 122 which is the center between the upper end portion 121 and the lower end portion 123 when the observer views the second display region 120) is placed near the visual field 200.

The HUD device 50 differs from the HUD device 20 of the first embodiment in that the image light 40 in the vertical direction is crossed in a relay optical system 55 as illustrated in FIG. 8. Consequently, the second display region 120 generated by the HUD device 50 of the second embodiment can be made convex in the opposite direction to the first display region 110 generated by the HUD device 20 of the first embodiment.

In FIG. 7, a reference plane 300 that is not curved (has no curvature) in the left-right direction (X axis) and the up-down direction (Y axis) of the vehicle 1 is virtually set in front of the vehicle 1, and in the display system 10 for a mobile object (HUD device 50) according to the second embodiment, the upper end portion 121 and the lower end portion 123 are each placed at such a position as to be farther from the visual field 200 with respect to the reference plane 300, and the central portion 122 is placed at such a position as to be closer to the visual field 200 with respect to the reference plane 300.

The following description refers to FIG. 9A through FIG. 9C. FIG. 9A through FIG. 9C are diagrams illustrating respective convergence angles toward points of the display region generated by the HUD device of the second embodiment, and respective convergence angles toward points on the reference plane overlapped on the points.

FIG. 9A illustrates the convergence angle from both eyes (a right eye 4R and a left eye 4L) located at a predetermined position of the visual field 200 (visual field reference position 200s) toward the upper end portion 121 of the second display region 120, and the convergence angle toward a first point 301 located on the reference plane 300 and overlapped on this upper end portion 121. Herein, the second display region 120 (upper end portion 121) is farther from the predetermined position of the visual field 200 with respect to the reference plane 300 (first point 301). That is, the convergence angle θHUD21 toward the upper end portion 121 of the second display region 120 is smaller than the convergence angle θsp21 toward the first point 301 on the reference plane 300.

FIG. 9B illustrates the convergence angle from the both eyes (the right eye 4R and the left eye 4L) located at the predetermined position of the visual field 200 (visual field reference position 200s) toward the central portion 122 of the second display region 120, and a convergence angle toward a second point 302 located on the reference plane 300 and overlapped on this upper end portion 121. Herein, the second display region 120 (central portion 122) is closer to the predetermined position of the visual field 200 with respect to the reference plane 300 (second point 302). That is, the convergence angle θHUD22 toward the central portion 122 of the second display region 120 is larger than the convergence angle θsp22 toward the second point 302 on the reference plane 300.

FIG. 9C illustrates the convergence angle from the both eyes (the right eye 4R and the left eye 4L) located at the predetermined position of the visual field 200 (visual field reference position 200s) toward the lower end portion 123 of the second display region 120, and the convergence angle toward a third point 303 located on the reference plane 300 and overlapped on this lower end portion 123. Herein, the second display region 120 (lower end portion 123) is farther from the predetermined position of the visual field 200 with respect to the reference plane 300 (third point 303). That is, the convergence angle θHUD23 toward the lower end portion 123 of the second display region 120 is smaller than the convergence angle θ23 toward the third point 303 on the reference plane 300.

A difference between θHUD and θsp is referred to as a convergence angle difference P (P21, P22, P23 in FIG. 7). In this embodiment, for example, the convergence angle difference P21 between the upper end portion 121 of the second display region 120 and the reference plane 300 (difference between the convergence angle θHUD21 and the convergence angle θsp21), the convergence angle difference P22 between the central portion 122 of the second display region 120 and the reference plane 300 (difference between the convergence angle θHUD22 and the convergence angle θsp22), and the convergence angle difference P23 between the lower end portion 123 of the second display region 120 and the reference plane 300 (difference between the convergence angle θHUD23 and the convergence angle θsp23) are each set within the threshold θth, so that the shape of the second display region 120 is approximated to the plane (reference plane 300). That is, the virtual image displayed in the second display region 120 is easily perceived by an observer as displayed on the plane.

The reference plane 300 is set such that the convergence angle differences P21, P22 and P23 are equal with respect to the display region 100 placed when viewed from the predetermined visual field reference position 200s in the visual field 200.

FIG. 10A is a diagram illustrating a second display region 120a placed when viewed from a visual field lower end 203 of the visual field 200. As a comparative example, the second display region 120s placed when viewed from the visual field reference position 200s is illustrated by dotted lines. In the second display region 120a placed when viewed from the visual field lower end 203, an upper end portion 121a, a central portion 122a, and a lower end portion 123a are each placed at such a position as to be farther from the visual field 200 with respect to the reference plane 300. When the display region 100s and the second display region 120a are compared with each other, the central portion 122a crosses over the reference plane 300, and therefore it is possible to suppress the amount of change (increase) in the distance difference (convergence angle difference P22) from the reference plane 300 with respect to the movement amount of the central portion 122.

FIG. 10B is a diagram illustrating a second display region 120b placed when viewed from a visual field upper end 201 of the visual field 200. As a comparative example, the second display region 120s placed when viewed from the visual field reference position 200s is illustrated by dotted lines. In the second display region 120b placed when viewed from the visual field upper end 201, a lower end portion 123b and a central portion 122b are each placed at such a position as to be closer to the visual field 200 with respect to the reference plane 300, and the upper end portion 121 is placed at such a position as to be farther from the visual field 200 with respect to the reference plane 300. When the display region 100s and the second display region 120b are compared with each other, the position of the lower end portion 123b changes significantly, but crosses over the reference plane 300, and therefore it is possible to suppress the amount of change (increase) in the distance difference from the reference plane 300 with respect to the movement amount of the lower end portion 123 (convergence angle difference P23).

Similarly, in the HUD device 50 of the second embodiment, in a case where a projection target member 2 of the vehicle 1 is a front windshield, the change of the shape and the placement of the display region 100 due to the change of the eye position is relatively large in a lower region of the visual field 200 (for example, a region on the lower side with respect to the visual field center 205). The change of the shape and the placement of the display region 100 is relatively small in an upper region of the visual field 200 (for example, a region on the upper side with respect to the visual field center 205). Therefore, in the HUD device 50 of this embodiment, the predetermined position in the up-down direction (Y-axis direction) of the visual field 200 between the visual field center 205 and the visual field lower end 203 is set to the visual field reference position 200s, and the shape and the placement of the display region 100 when viewed from this visual field reference position 200s are set such that the points of the display region 100 (the upper end portion 121, the central portion 122, and the lower end portion 123) are closed to the desired reference plane 300. Consequently, even in a case where the eye position 4 differs within the visual field 200, displacement from the desired reference plane 300 can be reduced. The shape and the placement of the display region 100 and the range of the visual field 200 are set such that the central portion 122 crosses over the reference plane 300 at the visual field lower end 203 (see FIG. 10A), the lower end portion 123 crosses over the reference plane 300 at the visual field upper end 201 (see FIG. 10B) in the above embodiment, but may be one of these. That is, for example, the upper end portion 121 may cross over the reference plane 300 at the visual field lower end 203 (see FIG. 10A), and the lower end portion 123 may not cross over the reference plane 300 at the visual field upper end 201. In this embodiment, there is a possibility that the upper end portion 121 does not cross over the reference plane 300 at the visual field lower end 203 (see FIG. 10A), and the lower end portion 123 does not cross over the reference plane 300 at the visual field upper end 201.

In the HUD device 50 of some embodiments, the shape and the placement of the display region 100 and the range of the visual field 200 may be set such that the maximum value of the convergence angle difference P between the second display region 120a and the reference plane 300 when the eye position 4 is located at the visual field lower end 203, and the maximum value of the convergence angle difference P between the second display region 120b and the reference plane 300 when the eye position 4 is located at the visual field upper end 201 are approximately equal to each other. Specifically, for example, in the HUD device 50, the shape and the placement of the display region 100 and the range of the visual field 200 may be set such that the convergence angle difference P21 between the upper end portion 121 of the second display region 120a and the reference plane 300 when the eye position 4 is located at the visual field lower end 203, and the convergence angle difference P23 between the lower end portion 123b of the second display region 120b and the reference plane 300 when the eye position 4 is located at the visual field upper end 201 are approximately equal to each other. Consequently, even in a case where the eye position 4 differs within the visual field 200, displacement from the desired reference plane 300 can be reduced.

In the above embodiment, the second display region 120 having a first curved shape is convex toward the visual field 200 in the left-right direction (X-axis) of the vehicle 1. However, in addition to the above, the second display region 120 may be convex toward the visual field 200 in the up-down direction (Y axis) of the vehicle 1. The display system 10 for a mobile object (HUD device 50) in this embodiment is optically designed such that the second display region 120 placed when viewed from the visual field 200 is convex on the visual field 200 side in the cross-sectional shape of the second display region 120 in the plane parallel to the front-rear direction and the left-right direction of the vehicle 1 (ZX plane), as illustrated in FIG. 11. That is, with a line segment connecting a left end portion 126 and a right end portion 127 of the second display region 120 as a reference, a middle region between the left end portion 126 and the right end portion 127 (including a central portion 122 which is the center between the left end portion 126 and the right end portion 127 when the observer views the second display region 120) is placed at such a position as to be closer to the visual field 200 with respect to the reference plane 300.

As illustrated in FIG. 11, in the display system 10 for a mobile object (HUD device 50) according to the second embodiment, the second display region 120 placed when the center of the both eyes is placed at the center in the left-right direction of the visual field 200 has the left end portion 126 and the right end portion 127 placed at such a position as to be closer to the visual field 200 with respect to the reference plane 300, and has the central portion 122 placed at such a position as to be farther from the visual field 200 with respect to the reference plane 300. The second display region 120 placed when the center of the both eyes is placed on the right side from the center in the left-right direction of the visual field 200 has the left end portion 126 and the central portion 122 placed at such a position as to be farther from the visual field 200 with respect to the reference plane 300, and has the right end portion 127 placed at such a position as to be closer to the visual field 200 with respect to the reference plane 300. On the contrary, the second display region 120 placed when the center of the both eyes is placed on the left side from the center in the left-right direction of the visual field 200 has the right end portion 127 and the central portion 122 placed at such a position as to be farther from the visual field 200 with respect to the reference plane 300, and has the left end portion 126 placed at such a position as to be closer to the visual field 200 with respect to the reference plane 300.

Now, an example in which the shape and the placement of the display region 100 are set by adjustment of an optical characteristic of an entire region or a part of the region in a virtual image optical system 90 (concave mirror 26), and adjustment of placement of optical members (such as the concave mirror 26) and the display surface 23 will be described.

FIG. 12A is a diagram illustrating the placement of the relay optical system 25 and the display surface 23 of the first embodiment. In FIG. 12A, in order to facilitate understanding of difference from a comparative example, respective focal points of regions 251, 252 and 253 of the relay optical system 25 are denoted by reference numerals 251f, 252f and 253f, but do not indicate the exact distance relationship with the relay optical system 25 or the display surface 23. The display surface 23 of this embodiment is inclined by an angle α from a vertical surface 23a with respect to the optical axis 40p of the image light 40 from the display surface 23 to the visual field 200. Specifically, the display surface 23 is placed such that compared to the vertical surface 23a, a region 231 of the display surface 23 corresponding to the upper end portion 111 (see FIG. 12B) of the first display region 110 as viewed from the observer is farther from the relay optical system 25, and a region 232 of the display surface 23 corresponding to the central portion 112 (see FIG. 12B) is close to the relay optical system 25. The relay optical system 25 of this embodiment has a different curvature radius for each region. Specifically, first optical power of the first region (first optical path) 251 of the relay optical system 25, through which first image light 41 pass, displaying a virtual image at the upper end portion 111 of the first display region 110 as viewed from a driver is smaller than second optical power of a second region (second optical path) 252 of the relay optical system 25, through which second image light 42 pass, displaying a virtual image at the central portion 112 visually recognized on the lower side with respect to the upper end portion 111 of the first display region 110 as viewed from the driver. That is, in a case where main optical power of the relay optical system 25 is caused by the first mirror 26 which is the concave mirror, the first curvature radius (an example of the first optical power) of the first region 251 that reflects the first image light 41 is made larger than the second curvature radius (an example of the second optical power) of the second region 252 that reflects the second image light 42. When the first curvature radius of the first region 251 that reflects the first image light 41 is increased, the focal point distance (½ of the curvature radius) of the focal point 251f of the first region 251 is increased.

Herein, an relation expression among a distance a (>0) between an object and a concave mirror, a distance b (>0) between a virtual image and the concave mirror, and the focal length f (>a) of the concave mirror is established as follows. According to this relation expression, when the curvature radius of the concave mirror is increased (the curvature of the mirror is decreased), the focal point distance of the concave mirror is increased, and when the focal point distance is increased, the distance b of the virtual image is decreased.

$$1/a - 1/b = 1/f$$

As described above, the display surface 23 is placed so as to be inclined from the optical axis 40p of the image light from the display surface 23 to the visual field 200, so that the first display region 110 can be placed along the road surface 310 (such that an image formation distance is gradually increased from a near part to a distant part). The first image light 41 projected from the display surface 23 to the first region 251 having the large curvature radius of the first mirror 26 has a long focal distance (distance from the first region 251 to the focal point 251f), and therefore when the first image light 41 is reflected by the projection target member 2, the image formation distance from the projection target member 2 is shortened (compared to a case where the curvature radius is not increased).

In the relay optical system 25 of this embodiment, as the virtual image displayed by passing image light is on upper side, the optical power is gradually decreased (the curvature radius is gradually increases), so that the upper end portion 111 of the first display region 110 can be curved so as to rise from the inclination along the road surface 310. Curving the upper end portion 111 such that the upper end portion 111 rises from the inclination along the road surface 310 means that as illustrated in FIG. 12B, the tilt angle θ between the tangent line of the first display region 110 at the upper end portion 111 and the road surface 310 (first tilt angle θ1) is larger than the tilt angle θ between the tangent line of the first display region 110 at the central portion 112 closer to the driver with respect to the upper end portion 111 and the road surface 310 (second tilt angle θ2), and the tilt angle θ increases continuously (monotonically) from the central portion 112 (near side) toward the upper end portion 111 (far side).

That is, in the HUD device 20 (HUD device 50 as well), the shape and the placement of the display region 100 (110, 120) can be set by adjustment of the optical characteristic of the entire region or a part of the region in the virtual image optical system 90, and adjustment of placement of optical members (such as the concave mirrors 26 and 56) and the display surface 23, adjustment of the shape of the display surface 23, or a combination of these.

As illustrated above, the head-up display device 20; 50 of this embodiment includes: the display 21 having the display surface 23 for emitting image light; and the relay optical system 25 that directs the image light 40 from the display 21 to the visual field 200 in the vehicle 1 through the projection target member 2 to allow the virtual image of the image displayed on the display surface 23 to be visually recognized within the display region 100 viewed from within the visual field 200, wherein the display region 100 includes the upper end portion 111; 121, the lower end portion 113: 123, and the central portion 112; 122 between the upper end portion 111 and the lower end portion 113, the display region has: 1) the first curved surface shape 110 in which the upper end portion 111 and the lower end portion 113 viewed from a predetermined eye position 200s within the visual field 200 are each placed at such a position as to be closer to the visual field 200 with respect to a predetermined reference plane 300, and the central portion 112 viewed from the predetermined eye position 200s is placed at such a position as to be farther from the visual field 200 with respect to the predetermined reference plane 300; or 2) the second curved surface shape 120 in which the upper end portion 121 and the lower end portion 123 viewed from the predetermined eye position 200s are each placed at such a position as to be farther from the visual field 200 with respect to the predetermined reference plane 300, and the central portion 122 viewed from the predetermined eye position 200s is placed at such a position as to be closer to the visual field 200 with respect to the predetermined reference plane 300, and the display region is formed such that a first convergence angle difference P11: P21 between a convergence angle from the eye position 200s to the upper end portion 111; 121 and a convergence angle from the eye position 200s to a first point 301 located on the reference plane 300 and passing through the upper end portion 111; 121, a second convergence angle difference P12; P22 between a convergence angle from the eye position 200s to the central portion 112; 122 and a convergence angle from the eye position 200s to a second point 302 located on the reference plane 300 and passing through the central portion 112; 122, and a third convergence angle difference P13; P23 between a convergence angle from the eye position 200s to the lower end portion 113; 123 and a convergence angle from the eye position 200s to a third point 303 located on the reference plane 300 and passing through the lower end portion 113; 123 are each within four milliradians. The display region which is a region where a virtual image is displayed is placed in a shape having a concave visual field side such that the upper end and the lower end are located on the front side with respect to a desired plane, and the middle region is located on the depth side, and the convergence angle difference between each of the upper end, the lower end, and the middle region and the desired plane is set within four milliradians, so that it is difficult to recognize distortion in the depth direction of the virtual image displayed within the display region, and even in a case where the eye position is displaced in the up-down direction, it is possible to suppress local increase of the convergence angle difference between the desired plane and the display region. In addition, the display region which is the region where the virtual image is displayed is in a shape having a convex visual field side such that the upper end and the lower end are located on the depth side with respect to a desired plane, and the middle region is located on the front side, and the convergence angle difference between each of the upper end, the lower end and the middle region and the desired plane is set within four milliradians, so that it is difficult to recognize distortion in the depth direction of the virtual image displayed within the display region, and even in a case where the eye position is displaced in the up-down direction, it is possible to suppress local increase of the convergence angle difference between the desired plane and the display region.

In some embodiments, the display region 100 may be formed such that: when viewed from an upper end 201 of the visual field 200, the upper end portion 111 viewed from the visual field 200 is placed at such a position as to be closer to the visual field 200 with respect to the predetermined reference plane 300, and the lower end portion 113 and the central portion 112 are each placed at such a position as to be farther from the visual field 200 with respect to the predetermined reference plane 300; and/or when viewed from a lower end 203 of the visual field 200, the lower end portion 113 viewed from the visual field 200 is placed at such a position as to be closer to the visual field 200 with reference to the reference plane 300, and the upper end portion 111 and the central portion 112 are each placed at such a position as to be farther from the visual field 200 with respect to the predetermined reference plane 300. Thus, the range of the visual field (the upper end or the lower end of the visual field) is set to a range in which the upper end or the lower end of the display region crosses over the desired plane in the depth direction, so that even in a case where the eye position is displaced in the up-down direction within the visual field, it is possible to suppress local increase of the convergence angle difference between the desired plane and the display region while widely ensuring the range of the visual field.

In some embodiments, the display region 100 may be formed such that: when viewed from an upper end 201 of the visual field 200, the upper end portion 121 is placed at such a position as to be farther from the visual field 200 with respect to the predetermined reference plane 300, and the lower end portion 123 and the central portion 122 are each placed at such a position as to be closer to the visual field 200 with respect to the reference plane 300; and/or when viewed from a lower end 203 of the visual field 200, the lower end portion 123 is placed at such a position as to be farther from the visual field 200 with respect to the predetermined reference plane 300, and the upper end portion 121 and the central portion 122 are each placed at such a position as to be closer to the visual field 200 with respect to the reference plane 300. Thus, the range of the visual field (the upper end or the lower end of the visual field) is set to a range in which the upper end or the lower end of the display region crosses over the desired plane in the depth direction, so that even in a case where the eye position is displaced in the up-down direction within the visual field, it is possible to suppress local increase of the convergence angle differ-ence between the desired plane and the display region while widely ensuring the range of the visual field.

In some embodiments, the predetermined eye position 200s may be placed between the visual field center 205 and the lower end 203, and the display region 100 may be formed such that the first convergence angle difference P11, the second convergence angle difference P12, and the third convergence angle difference P13 from the predetermined eye position 200s are approximately equal to each other. The degree of change in the shape and the placement of the display region 100 differs depending on whether the eye position is displaced upward or downward in the visual field. In other words, the rate of change in the shape and the placement of the display region 100 in relation to the amount of upward displacement of the eye position in the visual field is different from the rate of change in the shape and the placement of the display region 100 in relation to the amount of downward displacement of the eye position in the visual field. Therefore, in a case where the rate of change in the shape and the placement of the display region 100 in relation to the amount of downward displacement is large, the visual field reference position 200s where the first convergence angle difference P11, the second convergence angle difference P12, and the third convergence angle difference P13 are approximately equal is placed between the visual field center 205 and the lower end 203, so that even when the eye position 4 is the visual field lower end 203 of the visual field 200, it is possible to suppress local increase of the convergence angle difference between the desired plane and the display region. The predetermined eye position 200s may be placed between the visual field center 205 and the visual field upper end 201.

In some embodiments, the reference plane 300 may be a tangent line of a circle from the visual field center 205. Consequently, the concave or convex display region viewed from the center of the visual field is generally placed face to face, and the amount of displacement in the depth direction from the reference plane can be suppressed even in a case where the eye position changes within the visual field.

In some embodiments, the reference plane 300 may be a tangent line of a circle from the visual field center 205, and may be placed so as not to be parallel to a traveling direction of the vehicle.

In some embodiments, the reference plane 300 may be inclined such that the upper side is placed farther than the lower side viewed from the visual field 200

DESCRIPTION OF REFERENCE NUMERALS

1: vehicle
2: projection target member
4: eye position
4L: left eye
4R: right eye
10: display system
20: head-up display device (HUD device)
21: display
22: projector
23: display surface
23a: vertical surface
25: relay optical system
26: first mirror
27: second mirror
40p: optical axis
41: first image light
42: second image light
50: HUD device 55: relay optical system
90: virtual image optical system
100: display region
100s: display region
110: first display region (first curved surface shape)
111: upper end portion
112: central portion
113: lower end portion
116: left end portion
117: right end portion
120: second display region (second curved surface shape)
121: upper end portion
122: central portion
123: lower end portion
126: left end portion
127: right end portion
200: visual field
200s: visual field reference position (predetermined eye position)
201: visual field upper end
203: visual field lower end
205: visual field center
310: road surface
M: image
P: convergence angle difference
P11: first convergence angle difference
P12: second convergence angle difference
P13: third convergence angle difference

The invention claimed is:

1. A head-up display device comprising:
a display having a display surface for emitting image light; and
a relay optical system that directs the image light from the display to a visual field in a vehicle through a projection target portion to allow a virtual image of the image to be visually recognized within a display region viewed from within the visual field, wherein
the display region includes an upper end portion, a lower end portion, and a central portion between the upper end portion and the lower end portion,
the display region has: a first curved surface shape in which the upper end portion and the lower end portion viewed from a predetermined eye position within the visual field are each placed at such a position as to be closer to the visual field with respect to a predetermined reference plane, and the central portion viewed from the predetermined eye position is placed at such a position as to be farther from the visual field with respect to the predetermined reference plane; or a second curved surface shape in which the upper end portion and the lower end portion viewed from the predetermined eye position are each placed at such a position as to be farther from the visual field with respect to the predetermined reference plane, and the central portion viewed from the predetermined eye position is placed at such a position as to be closer to the visual field with respect to the predetermined reference plane, and
the display region is formed such that a first convergence angle difference between a convergence angle from the eye position to the upper end portion and a convergence angle from the eye position to a first point located on the reference plane and passing through the upper end portion, a second convergence angle difference between a convergence angle from the eye position to the central portion and a convergence angle from the eye position to a second point located on the reference plane and passing through the central portion, and a third convergence angle difference between a convergence angle from the eye position to the lower end portion and a convergence angle from the eye position to a third point located on the reference plane and passing through the lower end portion are each within four milliradians.

2. The head-up display device according to claim 1, wherein
the display region is formed such that:
when viewed from an upper end of the visual field, the upper end portion is placed at such a position as to be closer to the visual field with respect to the predetermined reference plane, and the lower end portion and the central portion are each placed at such a position as to be farther from the visual field with respect to the predetermined reference plane; and/or
when viewed from a lower end of the visual field, the lower end portion is placed at such a position as to be closer to the visual field with respect to the reference plane, and the upper end portion and the central portion are each placed at such a position as to be farther from the visual field with respect to the predetermined reference plane.

3. The head-up display device according to claim 1, wherein
the display region is formed such that:
when viewed from an upper end of the visual field, the upper end portion is placed at such a position as to be farther from the visual field with respect to the predetermined reference plane, and the lower end portion and the central portion are each placed at such a position as to be closer to the visual field with respect to the reference plane; and/or
when viewed from a lower end of the visual field, the lower end portion is placed at such a position as to be farther from the visual field with respect to the predetermined reference plane, and the upper end portion and the central portion are each placed at such a position as to be closer to the visual field with respect to the reference plane.

4. The head-up display device according to claim 1, wherein
the predetermined eye position is placed between a center and a lower end of the visual field, and
the display region is formed such that the first convergence angle difference, the second convergence angle difference, and the third convergence angle difference from the predetermined eye position are approximately equal to each other.

5. The head-up display device according to claim 4, wherein
the reference plane is placed so as not to be parallel to a traveling direction of the vehicle.

6. The head-up display device according to claim 1, wherein
the reference plane is a tangent line of a circle from a center of the visual field.

7. The head-up display device according to claim 1, wherein
the reference plane is placed so as to be inclined such that an upper side is located farther than a lower side as viewed from the visual field.

8. A mobile object comprising:
a display having a display surface for emitting image light;

a projection target portion; and a relay optical system that directs the image light from the display to a visual field in a vehicle through the projection target portion to allow a virtual image of the image to be visually recognized within a display region viewed from within the visual field, wherein the display region includes an upper end portion, a lower end portion, and a central portion between the upper end portion and the lower end portion, the display region has: a first curved surface shape in which the upper end portion and the lower end portion viewed from a predetermined eye position within the visual field are each placed at such a position as to be closer to the visual field with respect to a predetermined reference plane, and the central portion viewed from the predetermined eye position is placed at such a position as to be farther from the visual field with respect to the predetermined reference plane; or a second curved surface shape in which the upper end portion and the lower end portion-viewed from the predetermined eye position are each placed at such a position as to be farther from the visual field with respect to the predetermined reference plane, and the central portion viewed from the predetermined eye position is placed at such a position as to be closer to the visual field with respect to the predetermined reference plane, and the display region is formed such that a first convergence angle difference between a convergence angle from the eye position to the upper end portion and a convergence angle from the eye position to a first point located on the reference plane and passing through the upper end portion, a second convergence angle difference between a convergence angle from the eye position to the central portion and a convergence angle from the eye position to a second point located on the reference plane and passing through the central portion, and a third convergence angle difference between a convergence angle from the eye position to the lower end portion and a convergence angle from the eye position to a third point located on the reference plane and passing through the lower end portion are each within four milliradians.

9. The mobile object according to claim 8, wherein the display region is formed such that:

when viewed from an upper end of the visual field, the upper end portion is placed at such a position as to be closer to the visual field with respect to the predetermined reference plane, and the lower end portion and the central portion are each placed at such a position as to be farther from the visual field with respect to the predetermined reference plane; and/or when viewed from a lower end of the visual field, the lower end portion is placed at such a position as to be closer to the visual field with respect to the reference plane, and the upper end portion and the central portion are each placed at such a position as to be farther from the visual field with respect to the predetermined reference plane.

10. The mobile object according to claim 8, wherein the display region is formed such that:

when viewed from an upper end of the visual field, the upper end portion is placed at such a position as to be farther from the visual field with respect to the predetermined reference plane, and the lower end portion and the central portion are each placed at such a position as to be closer to the visual field with respect to the reference plane; and/or when viewed from a lower end of the visual field, the lower end portion is placed at such a position as to be farther from the visual field with respect to the predetermined reference plane, and the upper end portion and the central portion are each placed at such a position as to be closer to the visual field with respect to the reference plane.

11. The mobile object according to claim 8, wherein the predetermined eye position is placed between a center and a lower end of the visual field, and the display region is formed such that the first convergence angle difference, the second convergence angle difference, and the third convergence angle difference from the predetermined eye position are approximately equal to each other.

12. The mobile object according to claim 11, wherein the reference plane is placed so as not to be parallel to a traveling direction of the vehicle.

13. The mobile object according to claim 8, wherein the reference plane is a tangent line of a circle from a center of the visual field.

14. The mobile object according to claim 8, wherein the reference plane is placed so as to be inclined such that an upper side is located farther than a lower side as viewed from the visual field.

* * * * *